Feb. 10, 1970 C. WOODRUFF 3,494,692
ROTARY SOLENOID DRIVEN MEANS FOR REVERSIBLY MOVING
MOTION PICTURE FILM INTERMITTENTLY
Filed Dec. 6, 1967
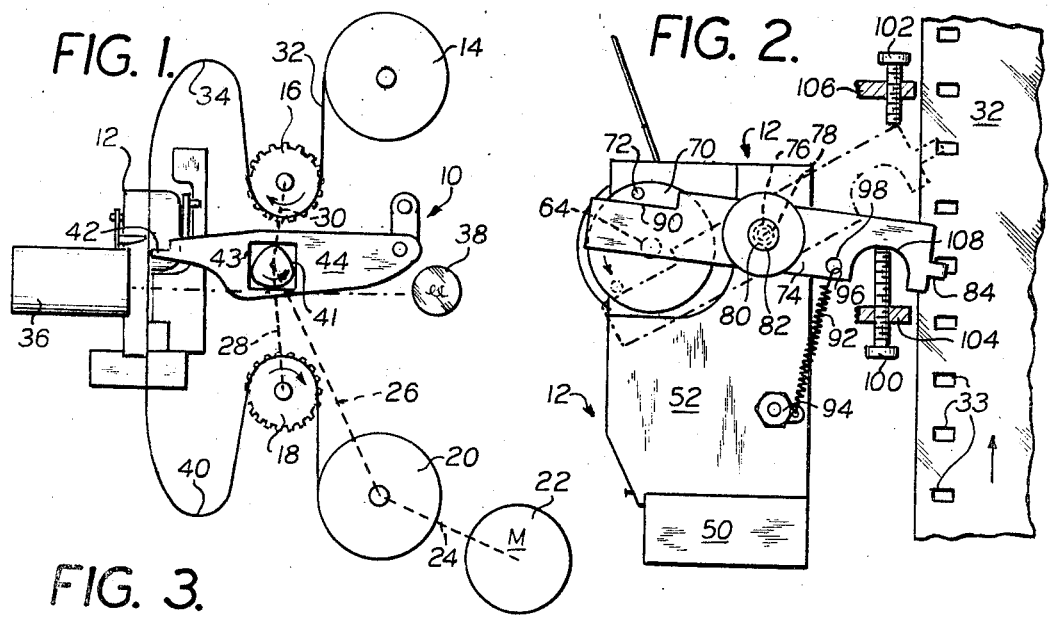
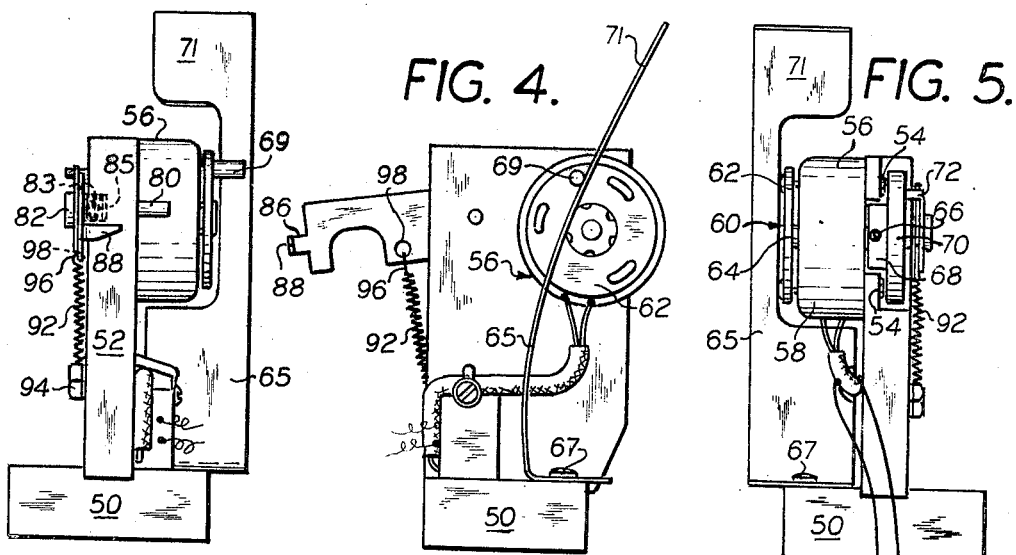
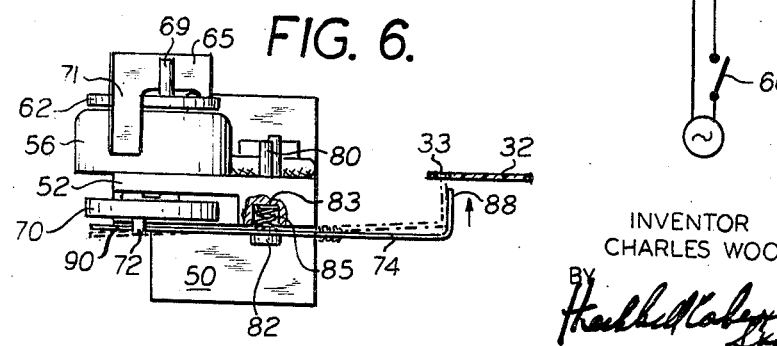
INVENTOR
CHARLES WOODRUFF
BY
ATTORNEYS.

United States Patent Office 3,494,692
Patented Feb. 10, 1970

---

3,494,692
ROTARY SOLENOID DRIVEN MEANS FOR REVERSIBLY MOVING MOTION PICTURE FILM INTERMITTENTLY
Charles Woodruff, New York, N.Y., assignor, by mesne assignments, to Visual Instruction Systems, Inc. (formerly Projection Instruction Corporation), New York, N.Y., a corporation of New York
Filed Dec. 6, 1967, Ser. No. 688,426
Int. Cl. G03b 21/38
U.S. Cl. 352—169    14 Claims

ABSTRACT OF THE DISCLOSURE

A motion picture film drive mechanism has a pawl extending perpendicularly from an elongated arm. The arm is attached to a rotary solenoid which has both a linear movement and a rotary movement. Upon energization the solenoid first moves the elongated arm perpendicular to the film such that the pawl engages the apertures in the film. Then the rotary movement of the solenoid rotates the elongated arm to move the pawl in the plane of the film for advancing the film.

---

CROSS-REFERENCES TO RELATED PATENTS

The present invention utilizes a rotary solenoid of the type described and claimed in U.S. Patent 2,496,880 granted to G. H. Leland on Feb. 7, 1950; the invention finds great utility in combination with the cartridge motion picture projector described and claimed in U.S. Patent 2,139,789 granted to C. O. Schrader on July 7, 1964, which projector utilizes a cartridge as described and claimed in either U.S. Patent 3,206,757 granted to C. O. Schrader on Sept. 14, 1965 or U.S. Patent 3,244,471, granted to B. R. Mead on Apr. 5, 1966.

BACKGROUND OF THE INVENTION

Field of the invention

The present invention relates to an apparatus for moving motion picture film one frame at a time, and especially to apparatus for moving motion picture film in a reverse direction one frame at a time.

Description of the prior art

Generally, motion picture film is advanced by a pawl which is driven in turn by a motor driven cam. Means utilizing the same driving mechanism have been employed to reversibly move motion picture film. Further, motor driven mechanisms have been previously devised for advancing motion picture film a single frame.

SUMMARY

A pawl is secured to the end of a pivoted lever which lever is mounted for pivotal movement in a plane substantially parallel to the plane of movement of motion picture film. The lever is also mounted for limited movement in a direction perpendicular to the plane of movement of the film. The lever is pivoted by a rotary solenoid as manufactured by Ledex Inc. pursuant to its U.S. Patent 2,496,880. Such a solenoid includes an armature which when actuated by the electromagnetic field of the solenoid will commence moving longitudinally which longitudinal movement is translated into rotary movement by cam tracks, or grooves. The pivoted lever is in engagement with the armature of the solenoid so as to receive therefrom both its longitudinal and rotatable movement, which movements will first pivot the pawl perpendicular to the plane of the film to move the pawl into a perforation in the film, and then pivot the pawl in the plane of movement of the film so as to move the film a discrete distance, preferably one frame.

BRIEF DESCRIPTION OF THE DRAWINGS

FIG. 1 is a diagrammatic view of a motion picture projector including the device of the present invention for reversing direction of movement of the film one frame;

FIG. 2 is a side elevation view of the film reversing device of the present invention in cooperation with a piece of film;

FIG. 3 is a front view thereof;

FIG. 4 is the opposite side view thereof;

FIG. 5 is a rear view thereof; and

FIG. 6 is a top view thereof.

DESCRIPTION OF THE PREFERRED EMBODIMENTS

As previously noted, the presented invention finds substantial utility in the cartridge motion picture projector as described in U.S. Patent 3,139,789, as such projector employs the cartridge of either U.S. Patent 3,206,757 or 3,244,471. However, a detailed description of such projector and such cartridges is deemed unnecessary to a full comprehension of the present invention in view of the fact that such detailed description would tend to obscure the manner of operation of the present invention.

Accordingly, the present invention is shown in combination with a schematically illustrated projector 10 in FIG. 1, the film reversal mechanism being designated therein by the reference numeral 12. Such projector 10 includes a feed or supply reel 14, a sprocketed drive wheel 16, a sprocketed drive wheel 18 and a take-up reel 20. The take-up reel 20 and the two sprocketed drive wheels 16 and 18 are all driven by a motor 22 which is connected thereto by any suitable drive train herein shown schematically by the dotted lines 24, 26, 28 and 30. Film designated by the reference numeral 32 follows a path from the feed or supply reel 14, around drive sprocket 16, then through a self formed loop 34, then perpendicularly downward to pass between a lens 36 and a light source 38, then around another loop 40, then around the drive sprocket 18, and then on to the take-up reel 20. The film 32 may be advanced by any suitable mechanism which mechanism is generally driven by the motor 20 through the mechanical drive train 26. The particular forward drive mechanism shown in FIG. 1 is a conventional drive mechanism including a pawl 42 which is secured at the end of a lever 44 that is adapted to impart a square motion to the pawl whereby to cause the pawl to move into a sprocket hole 33 in the film, and then move vertically downwardly as viewed in FIG. 1 for a distance of one frame and then be withdrawn from the sprocket hole and returned upwardly one frame for another engagement and another advancing of the film. The square motion imparted to the lever 44 and its pawl 42 is accomplished by seating a cam 41 inside of an aperture 43 in the lever 44, the came 41 being driven by motor 22 through drive means 24 and 26. This drive mechanism including cam 41 and aperture 43 is old and well known and forms no part of the invention per se. It is described merely by way of illustration of one means for advancing the film 32 in projector 10. The movement of the pawl 42 is in timed relation with the operation of a shutter (not shown). All of that which has been disclosed in the specification to this point is old and well known and thoroughly conventional.

In accordance with the present invention and as has already been stated, a device 12 is included in the conventional projector 10 for reversing the film 32 a frame at a time. Such a device is best illustrated in FIGS. 2 through 6. Referring now to FIGS. 2 through 6, the film reversal mechanism 12 includes a base plate or block 50 which may be secured in any desired manner to a fixed member forming a part of a casing or frame for the projector 10. Upstanding from the base 50 is a vertical support 52. Secured to one side of the vertical support 52 as by screws 54 is a rotary solenoid as manufactured and sold by Ledex Inc. and as described and claimed in Leland U.S. Patent No. 2,496,880. The rotary solenoid is generally designated by the reference numeral 56. While such devices are old and well known and require no specific description, for the purpose of full appreciation of the nature of the present invention it will be stated that rotary solenoid 56 includes a stationary stator 58 and an armature 60 which armature comprises a plate 62 and a shaft 64 secured at one end to the plate and extending through the center of the stator 58. When the stator winding is energized by the closing of a switch 66, the armature will commence moving axially to the right as viewed in FIG. 5 and that axial movement is translated by means internal to the rotary solenoid into a rotary movement of both the shaft and its plate 62.

Rotary solenoid armature 60 is biased to its normal or solid line position as shown in FIGS. 2 and 4 by a leaf spring 65 which is secured to the base 50 as by a screw 67 and which engages a horizontally outstanding pin 69 secured to armature plate 62. The leaf spring 65 impinges against or engages the pin 69 and biases the armature 60 in a counterclockwise direction as viewed in FIG. 4. When the solenoid 56 is energized the armature plate 62 will rotate in a clockwise direction against the bias of spring 65 to thereby increase the flexing of said spring. Upon the armature being de-energized the spring will restore the armature to its normal condition.

Preferably, spring 69 has an enlarged upper end 71 which upper end provides some resistance to the motion of spring 65 through the air as it flexes between its normal and operated positions. This air resistance slightly retards the action of the solenoid which improves the operation of the reversing mechanism 12.

Secured to the free or other end of armature shaft 64 as by a set screw 66 extending through a hub 68 on a circular disc 70 which has an abutment in the form of a cylindrical pin or dog 72 extending outwardly horizontally therefrom. As best seen in FIG. 2, the dog 72 is in its normal or de-energized position as shown in solid lines in said FIG. 2 and rotates to the dotted line position in said figure upon energization of the solenoid 56. Pin or dog 72 is engageable with the left hand end portion of a pivoted lever 74 which lever is pivotally mounted on the side of the vertical support member 52 as will now be described.

Specifically, a central portion of the lever 74 is provided with an aperture 76 through which the shank 78 of a pivot pin 80 passes with clearance, whereby to permit the lever 74 to pivot on the pin 80 in a vertical plane and in a horizontal plane for reasons which will become apparent hereinafter. Pivot pin 80 includes an enlarged head 82 for preventing lever 74 from becoming detached therefrom. Disposed about pin 80 and partially within an enlarged opening or cavity 83 in support 52 is a compression spring 85 which engages lever 74 and biases the lever in a clockwise direction in the horizontal plane, whereby to bias the left hand end of the lever 74 into engagement with disc 70 and the right hand end of the lever 74 away from the plane of the film 32. Provided at the right hand end of the pivoted lever 74 as viewed in FIG. 2 is a pawl 84 which as shown is formed integrally with the remainder of the lever 74 although, of course, it could be separated therefrom. As is clear from the drawings, the pawl 84 is made of a part 86 coplanar with the lever 74 and the pointed tip end 88 perpendicular thereto.

The mounting of the lever 74 on the support plate 52 is arranged so that the left hand end of the lever 74 as viewed in FIG. 2 is in surface-to-surface relation with the disc 70. Thus the upper edge of the left hand portion of lever 74, which edge is designated by the reference numeral 90, is in the path of movement of the pin 72 carried by the disc 70.

When the switch 66 is closed to close the energizing circuit to the rotary solenoid 56, the armature 60 of solenoid 56 will move axially to the right as viewed in FIG. 5, whereby to pivot the lever 74 in the horizontal plane as viewed in FIGS. 2 and 5, and the armature 60 will rotate in a counterclockwise direction as viewed in FIG. 2, whereby to cause pin 72 to engage lever edge 90 and move it downwardly so as to pivot lever 74 upwardly in a vertical plane from the solid line position of FIG. 2 to the dotted line position thereof. When the solenoid is de-energized, its return spring 65 will restore the solenoid to its normal de-energized position and a tension spring 92, which extends between and is connected to the plate 52 and the right hand end of lever 74, as viewed in FIG. 2, will restore the lever to its lower or solid line position as viewed in FIG. 2. As may be seen, tension spring 92 is secured to plate 52 by nut and bolt 94 and is secured to lever 74 as by hooking its end 96 through an aperture 98 in lever 74.

In accordance with another feature of the present invention adjustable stop means 100 and 102 are disposed for engagement with lever 74 to define respectively its lower and upper limits of movement in the vertical plane. As shown herein, the stop means 100 is a threaded member threadedly secured to a tapped plate 104 which is fixed relative to plate 52, and stop means 102 is a threaded member threadedly secured to a tapped plate 106 that is also fixed relative to plate 52. By making both stop means 100 and 102 threaded members, it will be obvious that they are adjustable to adjust the extent of vertical travel of the pawl 84 upon operation of the solenoid 56. Preferably the extent of such travel is the distance of one frame.

In operation the reversal mechanism 12 is disposed relative to the path of travel of the film 32 so that the pawl 84, and especially the pointed end thereof is spaced a short distance from the plane of travel of the film 32 between the loops 34 and 40. By the normal means for advancing the film 32 the film may be advanced in a normal motion picture mode or in the single frame projection mode. However, when it is desired to view a particular frame, which frame has already been projected, the standard drive mechanism is deactivated and the switch 66 is closed to energize solenoid 56 to cause its armature 60 to move to the right as viewed in FIG. 5 and to pivot in a counterclockwise direction as viewed in FIG. 2. The rightward movement as viewed in FIG. 5 will cause the pawl 84 to move into the plane of the film 32 through a film sprocket hole 33 whereby to engage the pawl with the film. The counterclockwise rotation of lever 74 will cause the now engaged film to move upwardly as viewed in FIG. 2 a distance determined by the stop means 100 and 102, which stop means, as already stated, is preferably spaced one frame apart. Thus, the film 32 will move upwardly or be reversed one frame as viewed in FIG. 2. Upon de-energization, solenoid armature 60 will rotate counterclockwise and will move axially to the left as viewed in FIG. 5 under the urging of spring 65, whereby to permit lever 74 to pivot out of the sprocket hole 33 and vertically clockwise under the urging of springs 85 and 94, respectively, to restore device 12 to its normal or solid line condition as shown in FIG. 2, whereby to condition the device for its next operation.

It has been found preferable to cause the edge 90 of lever 74 to be spaced from the pin 72 a short distance when the solenoid 56 is de-energized. This can obviously be achieved by adjusting the stop means 100. Thereafter the stop means 102 may be adjusted to permit the proper vertical extent of movement of the pawl 84 upon energization of solenoid 56. The purpose for spacing the edge 90 from pin 72 is to permit the solenoid armature to commence its axial and rotational movement without imparting a pivotal movement to the lever 74 in a plane parallel to the film. Thus, upon energization of the solenoid 56, the armature will move axially whereby to first pivot the pawl 84 into engagement with a film sprocket hole 33 and thereafter the pin 72 will engage the edge 90 of lever 74 so as to move the film 32 upwardly one frame.

It will be noted from the drawings that the lever 74 is shaped so that the edge 90 is not colinear with the remainder of the upper edge of the lever and that the lower edge of the lever 74 near the pawl 84 has a semicircular cut-out 108. The recessing of the upper edge 90 and of the cut-out 108 are merely design expedients in order to enable the device as described to be incorporated in a motion picture projector as described and claimed in the aforementioned Schrader Patent 3,139,789. However, it will be obvious to anyone skilled in the art that comparable operation of the device can be achieved without the inclusion of the recesesd edge 90 and the semicircular cut-out 108.

Further, it will be appreciated by anyone skilled in the art that the particular pivotal arrangement and spring biasing means for the lever 74 are a matter of design choice and that other means of mounting the lever 74 for universal pivotal movement and for return to a predetermined position may be employed within the scope of the present invention. Thus, for example, lever 74 could be pivotally mounted on vertical support plate 52 by a ball and socket type pivot which will provide for universal movement and a spiral spring could be employed in connection with such a pivot in order to provide for biasing of the lever to its normal or solid line position as shown in FIG. 2. Likewise, a spiral spring could be employed for clockwise biasing in the design as shown in the drawings in lieu of the compression spring 85 and tension spring 92.

While the mechanism 12 hereinbefore described finds its present utility as a frame-by-frame film reversal mechanism as already described, it will be obvious to anyone skilled in the art that substantially the same mechanism could be employed as a frame-by-frame film advancing mechanism. Further, if desired, such a film advancing mechanism could be employed in both single frame projection mode and in a motion picture projection mode by having a means for providing a pulsed input to the rotary solenoid 56 at the desired motion picture projection rate when in the motion picture projection mode, and by providing for manual energization of the solenoid when in a frame-by-frame projection mode.

While I have herein shown and described the presently preferred mode of practicing the present invention and have suggested various modifications thereof, other changes and modifications may be made therein within the scope of the appended claims without departing from the spirit and scope of this invention.

What is claimed is:

1. Means for moving in a longitudinal direction a strip of motion picture film having a plurality of longitudinally spaced sprocket holes therein, comprising:

(a) a support;
 (b) a movable member;
 (c) means for mounting said movable member on such support for movement of a portion thereof in a direction substantially parallel to the longitudinal extent of the film strip and in a direction substantially perpendicular thereto;
 (d) a pawl secured to said portion of said movable member and movable therewith; said pawl extending substantially perpendicular to said film at the line defined by said sprocket holes, whereby said pawl is registerable therewith;
 (e) a rotary solenoid having a stator fixed relative to said support and an armature that is movable both axially and rotatably from a normal position to an operated position; and
 (f) means for operatively connecting said armature to said movable member for moving said portion of said movable member and said pawl, perpendicular to said film from a normal to an operated position in response to said axial movement of said armature and for moving said portion of said movable member and said pawl parallel to the longitudinal extent of said film from a normal to an operated position in response to rotation of said armature, whereby to move said pawl into a sprocket hole and to move said film in a longitudinal direction along with the parallel movement of said pawl and said portion of said movable member.

2. The means for moving a strip of motion picture film as defined in claim 1, wherein said movable member is a lever, said mounting means is a pivotal mounting intermediate the two ends of said lever, said portion of said movable member is an end portion of said lever, and said connecting means is connected to said lever adjacent the other end thereof.

3. The means for moving a strip of motion picture film as defined in claim 2, wherein said lever is a longitudinally extending member which extends substantially parallel to the plane of said film.

4. The means for moving a strip of motion picture film as defined in claim 3, wherein the axis of said solenoid armature is substantially perpendicular to said lever, and said connecting means comprises an end portion of said armature operatively engageable with said other end portion of said lever for pivoting said lever in a plane substantially perpendicular to the plane of the film for moving said pawl into and out of a sprocket hole therein in response to axial movement of said solenoid armature, and further comprises a dog extending parallel to said armature and connected thereto for rotation therewith between a normal and an operated position, said other end of said lever being disposed in the path of movement of said dog, whereby to pivot said lever in a plane parallel to the plane of said film to move said pawl substatnially parallel to the longitudinal extent of said film.

5. The means for moving a strip of motion picture film as defined in claim 1, further comprising means for biasing said lever to its normal position, and means for biasing said solenoid armature to its normal position.

6. The means for moving a strip of motion picture film as defined in claim 4, further comprising means for biasing said lever to its normal position, and a cantilever leaf spring operatively engageable with said armature for biasing said armature to its normal position, said cantilever leaf spring having its free end portion of enlarged area.

7. The means for moving a strip of motion picture film as defined in claim 4, further comprising means for biasing said lever to its normal position, and means for biasing said solenoid armature to its normal position, and a pair of stop means engageable with said lever for defining the normal and operated positions of said lever in its movement therebetween in a plane parallel to the plane of the film.

8. The means for moving a strip of motion picture film as defined in claim 7, wherein when said armature and said lever are in their normal positions, said dog is spaced from said other end of said lever whereby said lever will pivot in a plane substantially perpendicular to said film prior to said lever pivoting in a plane substantially parallel to said film plane, whereby to engage said pawl in a sprocket hole prior to moving said pawl substantially parallel to the longitudinal extent of said film to thereby move said film in said longitudinal direction.

9. The means for moving a strip of motion picture film as defined in claim 4, wherein said end portion of said armature comprises a disc in surface-to-surface relation with said other end portion of said lever and said dog is secured to said disc.

10. The means for moving a strip of motion picture film as defined in claim 7, further comprising means for adjustably positioning said stop means relative to said lever 11. The means for moving a strip of motion picture film as defined in claim 6, further comprising a pair of stop means engageable with said lever for defining the normal and operated positions of said lever in its movement therebetween in a plane parallel to the plane of the film, means for adjustably positioning said stop means relative to said lever, and wherein said end portion of said armature comprises a disc in surface-to-surface relation with said other end portion of said lever, and said dog is secured to said disc, and wherein said stop means are positioned so that when said armature and said lever are in their normal positions, said dog is spaced from said other end of said lever, whereby said lever will pivot in a plane substantially perpendicular to said film prior to said lever pivoting in a plane substantially parallel to said film plane, whereby to engage said pawl in a sprocket hole prior to moving said pawl substantially parallel to the longitudinal extent of said film to thereby move said film in said longitudinal direction.

12. The means for moving a strip of motion picture film as defined in claim 1, wherein said longitudinal direction in which said means moves said film in a reverse direction, and further comprising means for moving said film in a forward direction.

13. The means for moving a strip of motion picture film as defined in claim 4, wherein said longitudinal direction in which said means moves said film is a reverse direction, and further comprising means for moving said film in a forward direction.

14. The means for moving a strip of motion picture film as defined in claim 11, wherein said longitudinal direction in which said means moves said film is a reverse direction, and further comprising means for moving said film in a forward direction.

References Cited

UNITED STATES PATENTS

| 2,588,813 | 3/1952 | Dube | 352—173 |
| 2,909,096 | 10/1959 | Barnett | 352—191 |
| 3,157,882 | 11/1964 | Barnett | 352—191 X |
| 3,357,780 | 12/1967 | Martin | 352—166 |

FOREIGN PATENTS 1,359,242  1/1967  France.

NORTON ANSHER, Primary Examiner

M. H. HAYES, Assistant Examiner

U.S. Cl. X.R.

226—62; 352—173, 191